Jan. 31, 1961  D. J. RAUN  2,969,860
VARIABLE-SPEED FLUID CLUTCH
Filed June 13, 1958  5 Sheets-Sheet 3
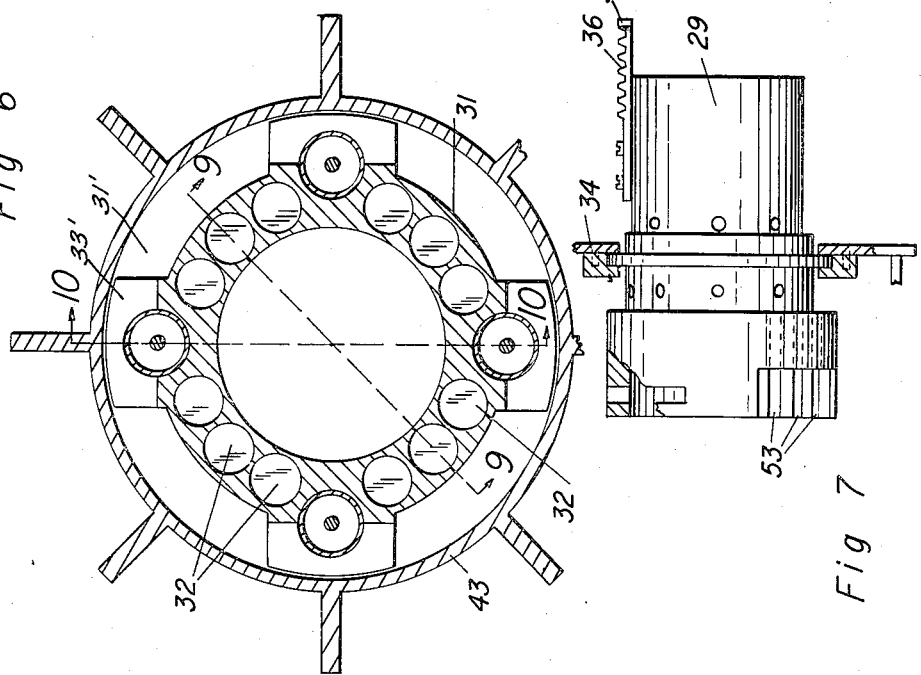
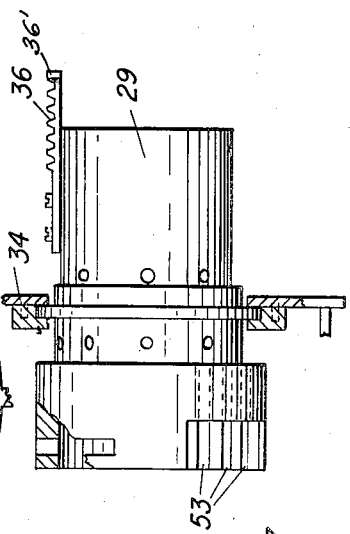
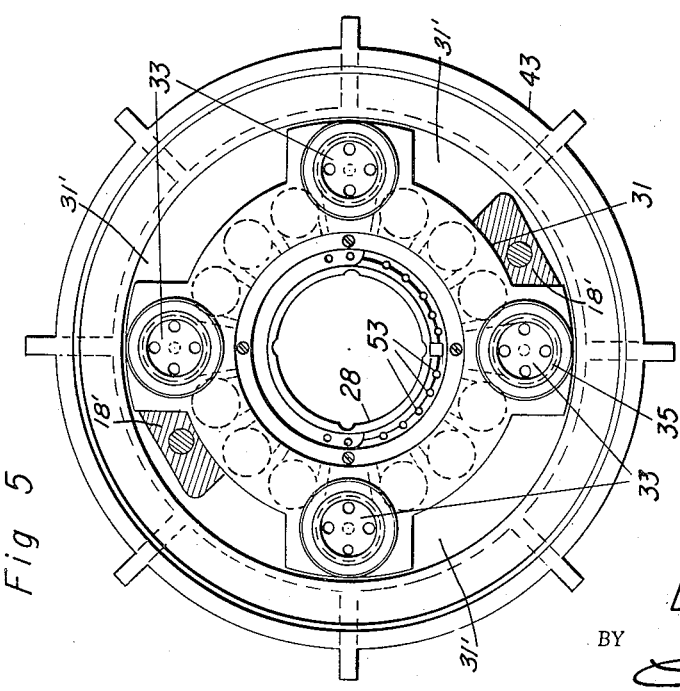
INVENTOR.
David J. Raun
BY
Atty Jan. 31, 1961 D. J. RAUN 2,969,860
VARIABLE-SPEED FLUID CLUTCH
Filed June 13, 1958 5 Sheets-Sheet 4

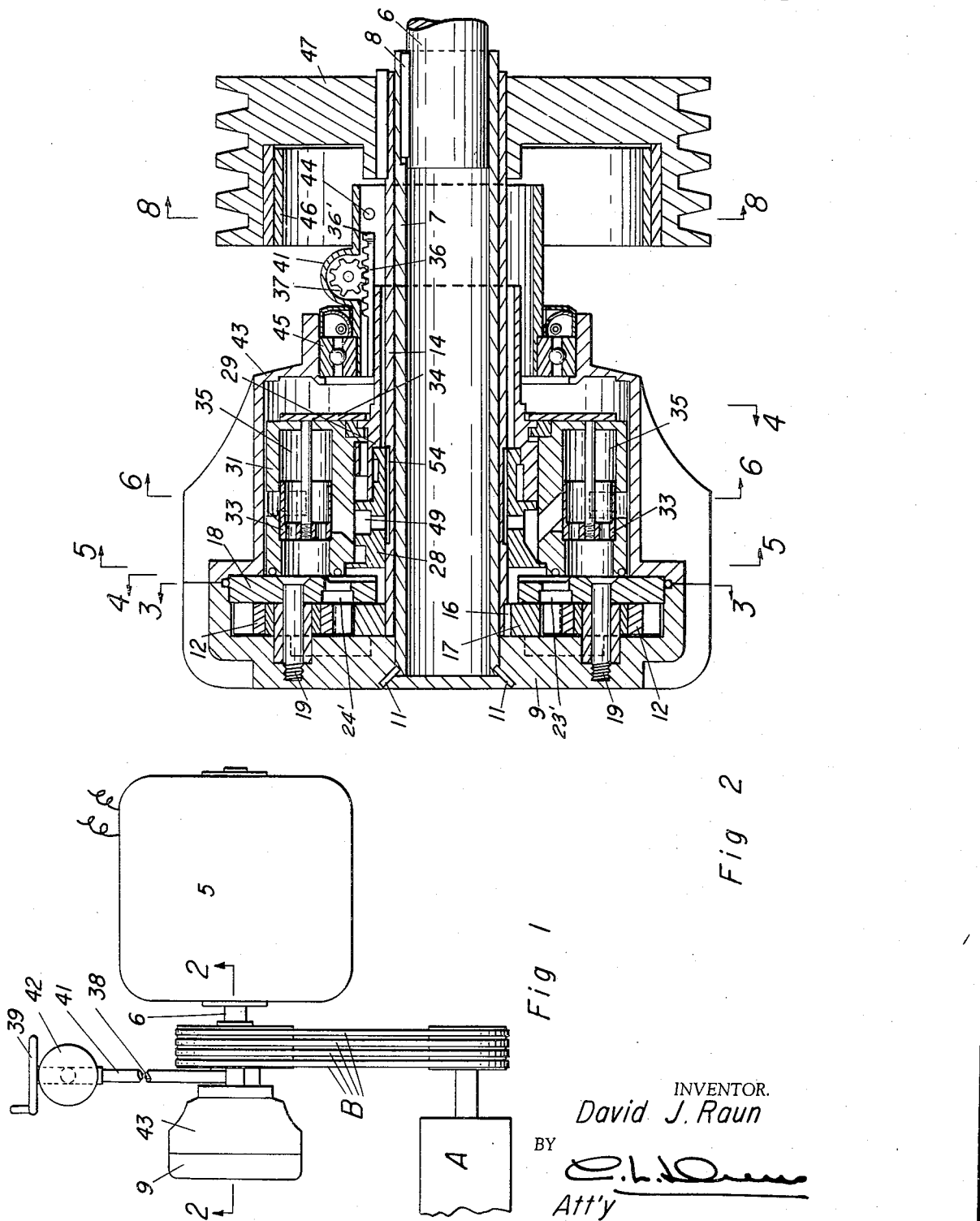

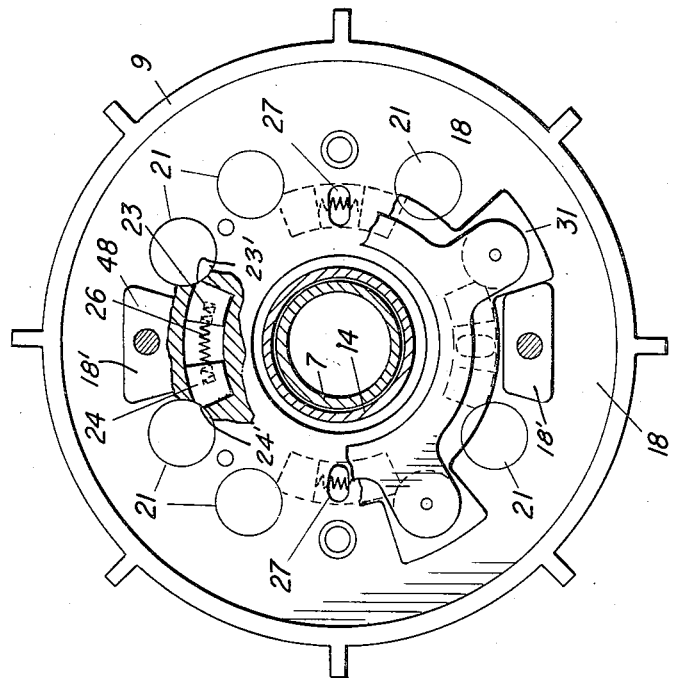
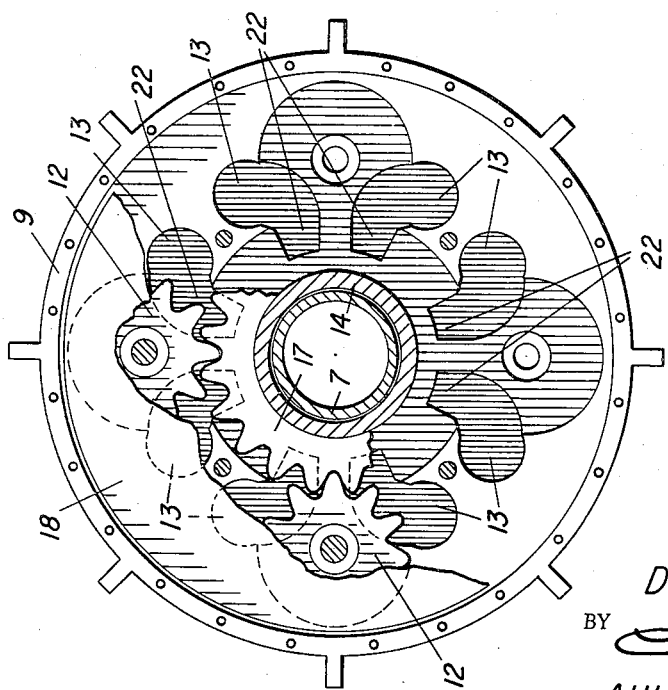
Fig 4
Fig 3
INVENTOR.
David J. Raun

INVENTOR.
David J. Raun
BY
Att'y

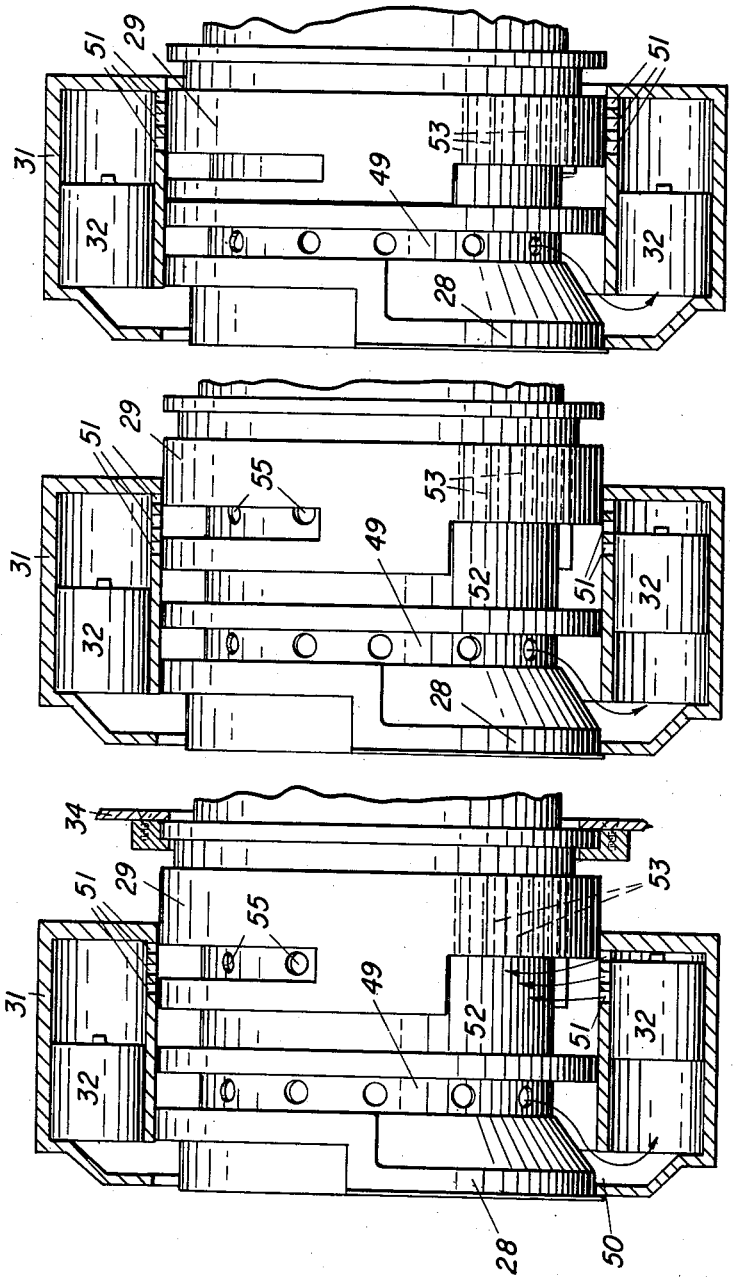

United States Patent Office 2,969,860
Patented Jan. 31, 1961

2,969,860

VARIABLE-SPEED FLUID CLUTCH

David J. Raun, Palm Springs, Calif.
(P.O. Box 314, Northridge, Calif.)

Filed June 13, 1958, Ser. No. 741,966

6 Claims. (Cl. 192—12)

This invention relates to improvements in a clutch unit.

The principal object of this invention is to provide a clutch that has a full range of speed variations from complete stop to full speed ahead.

A further object is to provide a clutch that can be connected directly to the armature shaft or power shaft of any motor in place of the usual pulley power take-off and having its pulley occupying the same relative position as the original power pulley.

A further object is to provide a stationary control for varying the speed changes without having to shut down the motive power in order to make the change.

A still further object is to provide a clutch of the hydraulic type in which there are no excessive oil pressures to cause leakage.

A still further object is to produce a clutch which is easy to install and one which is simple to manufacture.

Other objects and advantages will be apparent during the course of the following description.

In the accompanying drawings forming a part of this specification and in which like numbers are employed to designate like parts throughout the same:

Fig. 1 is a diagrammatic view showing my unit attached to a motor and employing a multiple belt power takeoff.

Fig. 2 is a cross-sectional view of my unit and pulley therefor, taken on the line 2—2 of Fig. 1 and on an enlarged scale;

Fig. 3 is a cross-sectional view taken on the line 3—3 of Fig. 2, and looking in the direction of the arrow, a portion of the pump-plate being cut away;

Fig. 4 is a cross-sectional view taken on the line 4—4 of Fig. 2, and looking in the direction of the arrow, with a portion of the pump plate removed;

Fig. 5 is a cross-sectional view taken on the line 5—5 of Fig. 2, and looking in the direction of the arrow;

Fig. 6 is a cross-sectional view taken on the line 6—6 of Fig. 2 and looking in the direction of the arrow;

Fig. 7 is a side elevation partly in cross-section of the main metering valve;

Figs. 11, 12 and 13 are enlarged cross-sectional views showing the various positions of the meter valve and meter with reciprocating pistons therein.

Figure 10:
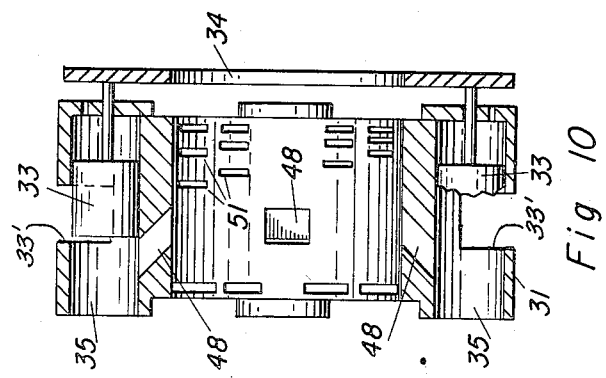
Fig. 10 is a cross-sectional view taken on the line 10—10 of Fig. 6.

There are many forms of clutches, such as electrical, hydraulic and mechanical, which are used for the purpose of varying speeds between the prime mover and the driven unit. These devices are usually rather inefficient for the reason that in the electrical type there is a great heat loss. In the straight hydraulic type there is a tendency for the oil to heat due to its compression and moving through restricted orifices. With the mechanical type there is undue friction.

Applicant has therefore devised a hydraulic clutch which is an improvement upon his former Patent No. 2,607,242, and while employing the same metering arrangement, the control and utilization of this metering arrangement has been greatly improved.

In the accompanying drawings, wherein for the purpose of illustration is shown a preferred embodiment of my invention, the numeral 5 designates a prime mover such as an electric motor. It is of course understood that any source of power may be employed for driving the shaft 6, to which my device is attached.

In order to accomplish this attachment, I provide a shaft 7, which slips over the end of the shaft 6 and is keyed thereto as by a key 8. This shaft is secured at its opposite ends to a pump housing 9, and to which it is keyed as shown at 11.

This housing is recessed so as to surround a plurality of pump gears 12, preferably four in number. This housing 9 is also recessed to form chambers on each side of the gears, as shown at 13, Fig. 3.

Surrounding the shaft 7 is an auxiliary shaft 14, to which is keyed, as at 16, a drive gear 17.

A pump plate 18 is recessed in pump housing 9 and secured therein through the medium of screws 19 which serve to position and provide shafts for the gears 12. This pump plate has a plurality of pairs of ports 21, each pair overlying a recessed chamber 13, see Figs. 3 and 4.

Communicating with and forming a part of each of these chambers 13 is a channel 22 (see Fig. 3), which channel permits oil to flow toward or away from the pumps, formed by the gears 12 and 17, depending upon the direction of rotation of the drive gear 17.

In order to relieve pump pressure when it is desired to idle, I provide in the pump plate 18, adjacent each of the gears, a plurality of pairs of opposed sliding valves 23 and 24 (see Fig. 4). These valves are normally held apart by a spring 26, and are adapted to close the relief ports 27 in plate 18 from either direction, depending upon the direction of rotation of shaft 6, to cause the pump to work in either direction. The valves 23, 24 have a portion 23', 24', respectively, which are subject to outlet oil pressure, depending upon the rotation of shaft 6, see Fig. 4. It will be observed that the meter housing 31, see Fig. 5, comprises a plurality of circumferentially spaced recesses 31' which communicate with the openings 33' opening into the bores 35, see Fig. 10. When no power is utilized by the pulley 47, oil pressure trapped in chambers 13 must be relieved in order to stop the unit A or reverse the motor 5.

The pairs of ports 21 communicating with a chamber 13 will either act as an outlet or return port depending upon the direction of rotation of the shaft 6. Thus during idling, oil pressure generated in the chambers 13 is directed from one outlet port 21 of a pair, into the bores 35, out of the openings 33', through the recesses 31' and back into the other return port 21 of the pair which communicate with a given chamber 13. It will be seen that during idling fluid is internally circulated in the manner described. However, in order to prevent oil pressure from between the teeth of the pump gears 12 and the main gear 17 in the chambers 13, the relief ports 27 will be maintained open during idling, since the spring 26 urges the valves 23, 24 apart and the major portion of the pressure developed is circulated through the pairs of ports 21 in the manner just described.

Positioned on the shaft 14 is a stationary valve-casing 28, which is keyed to a sliding valve 29, the operation of which will be later described.

Surrounding the last mentioned valve casing 28 and valve 29 is a meter housing 31 in which is mounted a plurality of free-floating reciprocable pistons 32 (see Figs. 11, 12 and 13). This housing also has bores 35 communicable with chambers 13 in which are mounted auxiliary control valves 33, which are each in turn connected to a spider 34 rotatably mounted with housing 31 on the sliding valve 29 and having axial movement therewith.

The sliding valve 29 has a rack 36 secured thereto, which rack is engaged by a pinion 37, carried by a speed control shaft 38, which may be rotated by a hand-wheel 39, the purpose of which will be later seen.

This shaft 38 is enclosed in a pipe 41, which serves to conduct oil from a supply tank 42 to the interior of the housing 43, which is attached to pump housing 9 and rotates therein and encloses the entire structure. A bearing and oil seal is shown at 45.

Figure 8:
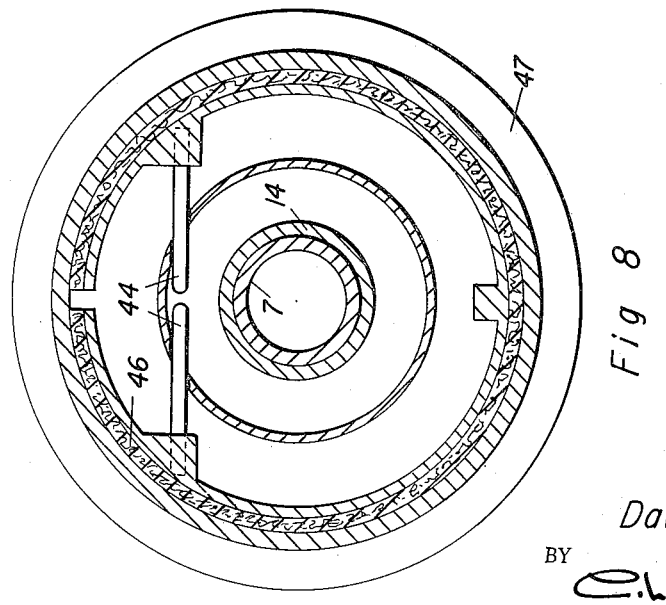
Fig. 8 is a cross-sectional view on the line 8—8 and looking in the direction of the arrow of Fig. 2, showing the brake control.

The end 36' of the rack 36 is V shaped when observed in plan as indicated by shading in Figs. 2 and 7, and which end serves to spread brake pins 44 when moved to the right in Fig. 2, the ends of which pins serving to expand a spring contractible brake lining 46 against the inner surface of a pulley 47 mounted on tubular shaft 14. The pins 44 support the brake band, see Fig. 8.

The terminal end 36' of the rack 36 will only engage the pins 44 when the pulley 47 is braked and when the terminal end 36' of the rack 36 disengages the pins 44, the brake lining 46 will contract to permit the pulley 47 to rotate with the shaft 14. This disengagement occurs due to movement of the rack 36 to the left-most position shown in Fig. 2.

It is to be here noted that the only parts that do not rotate are the speed control shaft 38 and its attached parts, the sliding valve 29 and the stationary valve casing 28 (in relation to rotation of shaft 6).

The stationary valve casing 28 serves the purpose of delivering oil from the pump gears through the ports 21 to the bores 35 and to the various chambers in which the free-floating pistons 32 travel, first passing the oil to the stationary valve casing 28, from which point the sliding valve 29 serves to receive and control the amount of oil which is fed to the opposite ends of the free-floating pistons 32.

In Figs. 11, 12 and 13 I have shown various positions of the sliding valve 29 with relation to the stationary valve-casing 28 so as to indicate the means for controlling the amount of movement of the free-floating pistons which serve to meter the amount of oil passing through the device.

The operation of my device is as follows:

The power unit 5 is started so that the shaft 6 is rotating and it is desired to transmit this power from my clutch to the driven unit A through the medium of the belts B, I first turn the handle 39, the initial movement of which is to withdraw the tapered nose 36' of the rack 36 from its position between the pins 44, moving the parts toward the "full power output" position shown in Fig. 2, which releases the spring-contractible brake band from its engagement with the inner surface of the pulley 47.

At the same time the sliding valve 29 is moved toward the left of the drawing (see Fig. 2), which tends to move the parts from the position shown in Fig. 11, and in so doing the rotating shaft 6 and shaft 7 will cause the gears to pump oil through one of the ports 21 on one side of each of the pump gears, depending upon the direction of rotation of the driving unit.

It is to be here noted that by viewing Fig. 4, stop 18' will permit meter housing 31 to rotate to a limited degree with respect to pump plate 18, thus aligning certain of the ports 21 with the bores 35, also depending upon the direction of rotation. The stop 18' will project into the recesses 31' of the metering housing 31, see Fig. 5, and abuttingly engage the portions thereof in which the bores 35 are formed.

The oil issuing from the pump will pass through the ports 21 and into the bores 35 in the meter housing in which the auxiliary control valves 33 are positioned and thence through the ports 48 (see Fig. 10), thence into an annular groove 49 in the stationary valve casing, which groove widens out on one side (see Fig. 12), and allows the oil to flow, as shown by the arrow, through passages 50, into one end of the bores 35 in which the free-floating pistons 32 are located, thus forcing the pistons toward the right of the drawing, and at the same time causing oil trapped in the bores 35 to pass outwardly through the ports 51, into the chamber 52, which is open to the housing through drill holes 53 in the sliding valve 29, see Fig. 5. At the same time oil is entering each successive bore 35 and being discharged in the manner just described, oil is also entering the opposite end of the bores through the ports 51 on the reverse movement of the pistons, oil in this instance being received from ports 55 when they are rotated into alignment with ports 51, so that there is a continuous pumping of a controlled amount of oil through the meter housing. Control is effected by the sliding valve cutting off one or more of the ports 51 as the meter housing revolves thereabout.

Figure 9:
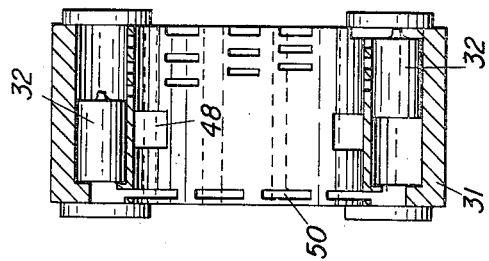
Fig. 9 is a cross-sectional view of the meter taken on the line 9—9 of Fig. 6.

By referring to Figs. 9 and 10, it will be noted that the ports 51 are slightly out of alignment with each other a few thousandths of an inch so that this pumping operation may be very finely controlled as to the amount of oil measured by the reciprocation of each floating piston.

It is thus apparent that the travel of the controlled movement of the free-floating pistons governs the amount of oil passing through the pump and consequently the speed variation.

It is of course understood that during the metering operation each bore is taking in oil at one end and releasing it at the other, and that the amount of movement of the piston is the controlling factor in the ratio of feed control.

In order to deliver oil to the left-hand end of each of the bores, oil passes through a channel 54 formed in the auxiliary shaft 14.

It will thus be seen that I have produced a clutch which accomplishes all of the objects above set forth. It is to be understood that the form of my invention that is herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a variable-speed fluid clutch, a driven shaft, a pump housing secured to said driven shaft and rotatable therewith, a tubular shaft circumposed about said driven shaft and freely rotatable thereon, a drive gear secured to said tubular shaft within said pump housing, a plurality of pump gears journaled in said housing and meshed with said drive gear, a pump plate in said housing and enclosing said gears, said housing and pump plate forming pump chambers about said pump gears, said pump plate including port means communicating with said pump chambers for permitting fluid to be circulated therethrough, a valve casing circumposed about said tubular shaft, a meter housing circumposed about said valve casing and including bore portions communicable with said port means of said pump plate for receiving oil from said pump chambers, said meter housing bore portions communicating with said port means for returning fluid to said pump chambers, and sliding control valve means including valve portions in said bore portions for controlling fluid flow through said pump chambers.

2. The structure of claim 1; and relief valve means interposed between said pump chambers and said meter housing bore portions and including displaceable valve elements subject to pressure developed in said pump chambers for permitting relative rotation of said driven shaft and pump housing with respect to said tubular shaft.

3. The structure of claim 2; said port means comprising pairs of ports communicating with each pump chamber, said meter housing being rotatable relative to said pump plate about said valve casing for selectively orienting the meter housing bore portions with one of said pairs of ports to permit reversing of said driven shaft.

4. The structure of claim 1; said pump plate including a relief port selectively covered by one of said valve elements, and means biasing said valve elements apart to maintain the relief port open during idling of said tubular shaft.

5. The structure of claim 1; said control valve means valve portions comprising a plurality of axially displaceable valves, a valve sleeve circumposed about said tubular shaft and axially displaceable relative to said casing and said meter housing, and a support spider journaled on said valve sleeve for axial movement therewith and connected to said axially displaceable valves for simultaneously moving the same.

6. The structure of claim 5; and axially disposed force transmitting means connected to said valve sleeve, a power take-off means connected to said tubular shaft, and brake means engageable with said power take-off means, said force transmitting means including a portion engageable with said brake means for operating the same.

References Cited in the file of this patent
UNITED STATES PATENTS

| | | |
|---|---|---|
| 2,066,450 | Bascle et al. | Jan. 5, 1937 |
| 2,607,242 | Raun | Aug. 19, 1952 |
| 2,644,561 | Dikeman | July 7, 1953 |
| 2,709,508 | Dikeman | May 31, 1955 |
| 2,839,889 | McGill | June 24, 1958 |